(12) United States Patent
Yarino et al.

(10) Patent No.: US 11,649,783 B2
(45) Date of Patent: May 16, 2023

(54) COMBUSTION CHAMBER STRUCTURE FOR INTERNAL COMBUSTION ENGINE

(71) Applicant: TOYOTA JIDOSHA KABUSHIKI KAISHA, Aichi-ken (JP)

(72) Inventors: Motonari Yarino, Shizuoka-ken (JP); Noriyuki Takada, Susono (JP); Atsushi Inoue, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/963,130

(22) Filed: Oct. 10, 2022

(65) Prior Publication Data
US 2023/0112941 A1  Apr. 13, 2023

(30) Foreign Application Priority Data
Oct. 12, 2021  (JP) ................................ JP2021-167483

(51) Int. Cl.
*F02F 1/24* (2006.01)
*F02B 23/10* (2006.01)
*F02F 1/42* (2006.01)

(52) U.S. Cl.
CPC ............ *F02F 1/242* (2013.01); *F02B 23/105* (2013.01); *F02F 1/4285* (2013.01); *F02B 2023/106* (2013.01)

(58) Field of Classification Search
CPC ... F02F 1/242; F02F 1/4285; F02B 2023/106; F02B 1/08; F02D 41/401; F02D 41/0007
See application file for complete search history.

(56) References Cited

U.S. PATENT DOCUMENTS

| 9,803,539 B2* | 10/2017 | Sato ....................... F02M 61/14 |
| 2003/0010313 A1* | 1/2003 | Fukuzumi ............. F02B 17/005 123/301 |
| 2009/0025680 A1* | 1/2009 | Kihara ............... F02M 61/1813 123/299 |

FOREIGN PATENT DOCUMENTS

| JP | 2000356151 A | 12/2000 |
| JP | 2009228582 A | 10/2009 |

* cited by examiner

*Primary Examiner* — Syed O Hasan
(74) *Attorney, Agent, or Firm* — Hauptman Ham, LLP

(57) ABSTRACT

A combustion chamber structure in which an installation hole of the injector is improved to realize a rapid combustion and to reduce an unburned hydrocarbon. In the combustion chamber, a leading end of an injector is withdrawn from an upper end of an opening of an installation hole, and an additionally expanded surface area is formed on an upper inner surface of the installation hole from a portion to which the leading end of the injector is situated to an opening end of the installation hole. An angle between the additionally expanded surface area and a joint surface of a cylinder head is narrower than an angle between a center axis of the installation hole and the joint surface.

5 Claims, 3 Drawing Sheets

COMBUSTION CHAMBER STRUCTURE FOR INTERNAL COMBUSTION ENGINE

The present disclosure claims the benefit of Japanese Patent Application No. 2021-167483 filed on Oct. 12, 2021 with the Japanese Patent Office, the disclosure of which is incorporated herein by reference in its entirety.

BACKGROUND

Field of the Disclosure

The present disclosure relates to a combustion chamber structure for an internal combustion engine in which fuel is directly injected into cylinders, and more specifically, to a structurer of a combustion chamber into which the fuel is injected laterally.

Discussion of the Related Art

JP-A-2000-356151 describes a direction injection spark ignition type internal combustion engine. In the internal combustion engine described in JP-A-2000-356151, a fuel injection valve is arranged such that a leading end thereof is aligned with a combustion chamber, and a projection part adjacent to a fuel spray is provided to a wall surface of a cylinder head combustion chamber between a fuel injection valve and an ignition plug. Therefore, a fuel spray injected at a high pressure is attracted to the wall surface of the cylinder head toward an ignition plug along the projection part by the Coanda effect. By contrast, the Coanda effect is eliminated by reducing the fuel injecting pressure so that the fuel spray in the combustion chamber is homogenized.

JP-A-2009-228582 describes a cylinder direct injection spark ignition type internal combustion engine. In the internal combustion engine described in JP A-2009-228582, a multi-hole injector faces the inside of a combustion chamber from a space between the two intake ports so as to directly inject the fuel into the combustion chamber. According to the teachings of JP-A-2009-228582, specifically, a top wall of the combustion chamber partially bulges upwardly toward the injector so that a leading end is situated inside of the combustion chamber. In addition, in order to create a tumble flow in the combustion chamber thereby promoting uniform dispersion of an air-fuel mixture, an injecting direction of the air-fuel mixture from a most downward-facing injection hole is set such that an angle between a center axis of a cylinder and the injecting direction of the air-fuel mixture is narrower than 35 degrees.

As taught by JP-A-2000-356151, a condition of the injected fuel varies depending on a clearance between an injecting angle of the fuel with respect to the wall surface of the combustion chamber. According to the teachings of JP-A-2000-356151, therefore, fuel injection is optimized according to an operating condition of the internal combustion engine selectively utilizing configurations of the wall surface of the combustion chamber. However, according to the teachings of JP-A-2000-356151, the fuel injecting pressure is merely switched between the high pressure and the low pressure. That is, the fuel spray may not be refined in every situation to stabilize fuel combustion and to purify exhaust gas.

On the other hand, in the internal combustion engine described in JP-A-2009-228582, dispersion of the air-fuel mixture injected from the most downward-facing injection hole may be homogenized. However, according to the teachings of JP-A-2009-228582, dispersion of the air-fuel mixture injected above the most downward-facing injection hole may not be homogenized. In the internal combustion engine described in JP-A-2009-228582, specifically, the top wall at the leading end of the injector is slightly displaced upwardly from an extension of an outer circumferential surface of the injector in an axial direction. However, JP-A-2009-228582 is silent about an amount of displacement of the top wall and an orientation of the injector. That is, the fuel injected from the injector while expanding in front would be affected by the top wall of the combustion chamber, but JP-A-2009-228582 is silent about the configuration of the top wall. Therefore, combustion of the internal combustion engine may not be started promptly, and an unburned hydrocarbon may not be reduced.

SUMMARY

Aspects of preferred embodiments of the present disclosure have been conceived noting the foregoing technical problems, and it is therefore an object of the present disclosure to provide a combustion chamber structure in which an installation hole of the injector is improved to realize a rapid combustion and to reduce an unburned hydrocarbon.

An exemplary embodiment of the present disclosure relates to a combustion chamber structure for an internal combustion engine, comprising: a combustion chamber that is formed in a cylinder head attached to a cylinder block; an ignition plug having an electrode that is arranged in an upper section of the combustion chamber; an injector that is attached to the cylinder head to inject fuel into the combustion chamber; and an installation hole that is formed in the cylinder head such that an opening of the installation hole is joined to a periphery of a roof of the combustion chamber, and that a center axis of the installation hole tilts downwardly toward the combustion chamber below the electrode of the ignition plug. In order to achieve the above-explained objective, according to the exemplary embodiment of the present disclosure, the injector is held in the installation hole while being in contact with an inner surface of the installation hole such that a leading end of the injector is withdrawn from an upper end of the opening of the installation hole in a direction along the center axis of the installation hole. In addition, an additionally expanded surface area is formed on an upper inner surface of the installation hole from a portion to which the leading end of the injector is situated to the upper end of the opening of the installation hole. Specifically, an angle between the additionally expanded surface area and a joint surface of the cylinder head joined to the cylinder block which is measured along a plane perpendicular to the joint surface and passing through the center axis of the installation hole, is narrower than an angle between the center axis of the installation hole and the joint surface of the cylinder head.

In a non-limiting embodiment, the injector may comprise a plurality of spray outlets to inject the fuel. In addition, the additionally expanded surface area includes a depressed surface area that is depressed upwardly in the vicinity of an uppermost one of the spray outlets of the injector along a flowing direction of the fuel injected from the uppermost one of the spray outlets of the injector. Specifically, an angle between the depressed surface area and the joint surface of the cylinder head may be narrower than the angle between the additionally expanded surface area and the joint surface of the cylinder head.

In a non-limiting embodiment, the combustion chamber structure may further comprise two intake ports formed in the roof of the combustion chamber, and the injector may be disposed between the intake ports.

In a non-limiting embodiment, the combustion chamber structure may further comprise two exhaust ports formed in the roof of the combustion chamber on an opposite side of the intake ports across the electrode of the ignition plug. In addition, a tumble flow of the fuel may be created in the combustion chamber so that the fuel flows from the intake port toward the exhaust port along the roof, and turns along the electrode of the ignition plug to further flow toward the intake port in a lower section of the combustion chamber to enter the opening of the installation hole.

Thus, according to the exemplary embodiment of the present disclosure, the additionally expanded surface area s formed on the upper inner surface of the installation hole from the portion to which the leading end of the injector is situated to the roof of the combustion chamber. Specifically, the additionally expanded surface area is formed such that a clearance between the additionally expanded surface area and the center axis of the injector increases gradually toward the opening of the installation hole. According to the exemplary embodiment of the present disclosure, therefore, the sprays of fuel injected from the outlets of the injector will not be attracted to the additionally expanded surface area. For this reason, the sprays of the fuel are allowed to flow and disperse homogeneously. In addition, a flame and a hot gas generated by igniting the electrode of the ignition plug are guided by the additionally expanded surface area to enter the installation hole in which the injector is held. For this reason, the fuel can be combusted promptly, and an unburned hydrocarbon may be reduced.

As described, the additionally expanded surface area includes the depressed surface area that is depressed upwardly in the vicinity the uppermost spray outlet of the injector. According to the exemplary embodiment of the present disclosure, therefore, the spray of fuel injected from the uppermost outlet of the injector will not be attracted to the additionally expanded surface area. For this reason, all of the sprays of the fuel injected from the outlets of the injector are allowed to flow and disperse homogeneously.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings.

Note that the embodiments shown below are merely examples the present disclosure, and do not limit the present disclosure.

Figure 1:
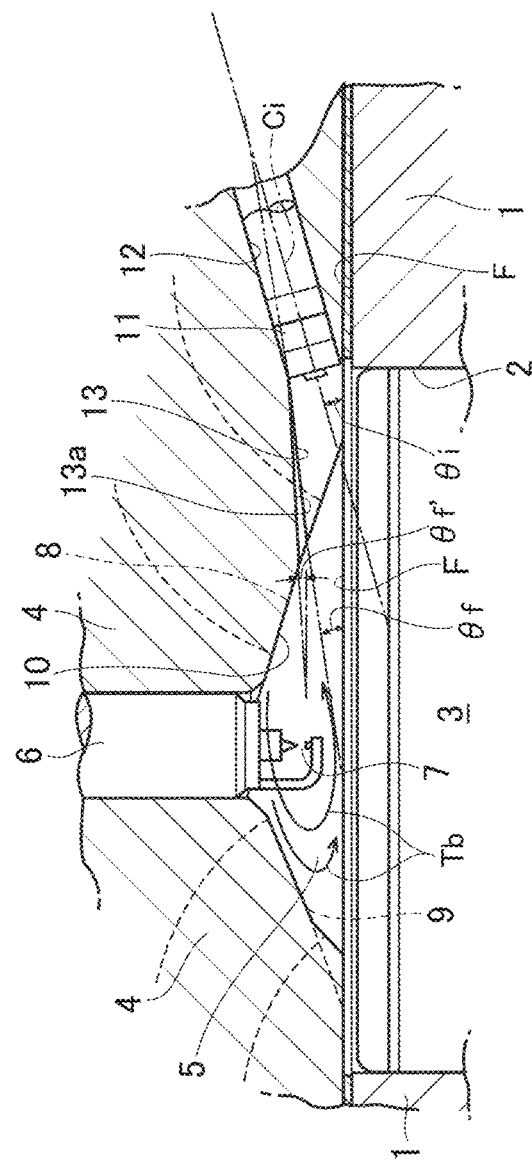
FIG. 1 is a cross-sectional view showing a cross-sectional shape of a combustion chamber according to the exemplary embodiment of the present disclosure along line in FIG. 2, and a location of an injector in the combustion chamber.
Figure 2:
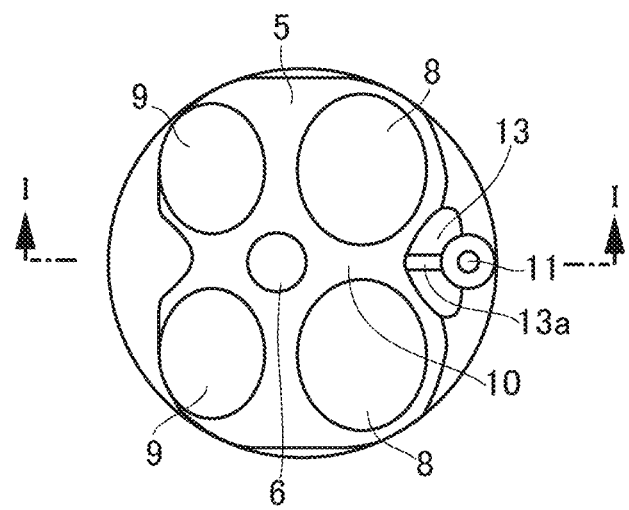
FIG. 2 is a front view of e combustion chamber viewing form a side where a piston is arranged.

Turning now to FIG. 1, there is shown one example of a combustion chamber of an internal combustion engine according to the exemplary embodiment of the present disclosure, Specifically, FIG. 1 shows a cross-section of the combustion chamber along I-I line in FIG. 2 showing a front view of the combustion chamber viewed from a side where a piston 3 is arranged. As illustrated in FIG. 1, in the combustion chamber, a bore 2 is formed in a cylinder block 1, and the piston 3 is held in the bore 2 in an air-tight manner while being allowed to reciprocate therein. In the following explanations, a reciprocating direction of the piston 3 will be referred to as the "vertical direction", and a direction perpendicular thereto will be referred to as the "horizontal direction" for the sake of explanation. A cylinder head 4 is attached to an upper end of the cylinder block 1, and a portion of the cylinder head 4 above the bore 2 is depressed upwardly to serve as a combustion chamber 5.

An ignition plug 6 is arranged about the center part of the cylinder head 4 above the combustion chamber 5, and an electrode 7 of the ignition plug 6 protrudes into the combustion chamber 5. As illustrated in FIG. 2, intake ports 8 and exhaust ports 9 are formed on both sides of the ignition plug 6 in the horizontal direction. Specifically, two intake ports 8 are formed in the right side of the ignition plug 6 along an axial direction of a crankshaft (not shown), and two exhaust ports 9 are formed in the left side of the ignition plug 6 along the axial direction of the crankshaft. Accordingly, the combustion chamber 5 has a pent roof 10 in which a height thereof increases gradually from right and left ends. Although not shown in FIGS. 1 and 2, the intake ports 8 and the exhaust ports 9 are selectively opened and closed by valves. Specifically, as indicated by arrows in FIG. 1, the intake port 8 or the valve opening and closing the intake port 8 is configured such that a tumble flow Tb is created in the combustion chamber during an intake stroke of the piston 3 downwardly toward a bottom dead center.

An injector 11 that injects the fuel is arranged outside of an outermost portion periphery) of the pent roof 10 (or the combustion chamber 5) between the intake ports 8. In the combustion chamber, not only an injector having one spray outlet but also a multi-hole injector having a plurality of spray nozzles may be adopted as the injector 11. In order to perform a so-called "side injection", an installation hole 12 is formed obliquely in the cylinder head 4 in such a manner as to open toward the combustion chamber 5, and the injector 11 is fixed in the installation hole 12. To this end, the injector 11 is arranged in such a manner as to inject the fuel from the vicinity of a joint surface F of the cylinder head 4 joined to the cylinder block 1, into the combustion chamber 5 below the ignition plug 6. Specifically, the installation hole 12 opens toward the joint surface F or a lower surface of the cylinder head 4 being flush with a squish area between the intake ports 8 formed on the pent roof 10 of the combustion chamber 5. The injector 11 is held in the installation hole 12 such that a common center axis Ci of the injector 11 and the installation hole 12 extends diagonally with respect to a plane parallel to the joint surface F (to be simply referred to as the joint surface F hereinafter) at a predetermined angle θi as an acute angle which is significantly narrower than 90 degrees. Accordingly, an outlet of the injector is oriented obliquely downwardly toward a center of a piston head.

Specifically, the pent roof 10 is a curved or domed ceiling having an arcuate cross-section that is highest at the center of the bore 2. That is, an angle between the joint surface F and the pent roof 10 is an obtuse angle which is significantly wider than 90 degrees. In other words, a direction of tilt of the pent roof 10 in which the installation hole 12 is formed and a direction of tilt of the installation hole 12 or the injector 11 held therein are opposite to each other. Accordingly, as schematically illustrated in FIG. 3, an upper end of an opening of the installation hole 12 is located closest to the center of the combustion chamber 5, and a lower end of the opening of the installation hole 12 is located outside of the combustion chamber 5.

Figure 3:
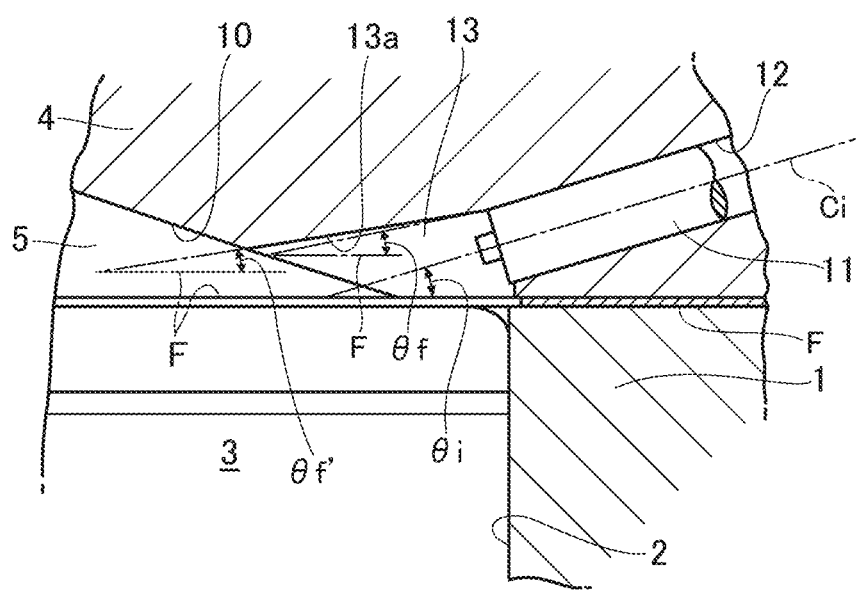
FIG. 3 is a partial cross-sectional view showing a cross-section of an additionally expanded surface area in an enlarged scale.

As depicted in FIG. 3, the injector 11 is held in the installation hole 12 while being in contact with an inner circumferential surface of the installation hole 12, without projecting significantly therefrom toward the combustion chamber 5. Specifically, a leading end of the injector 11 is aligned with the lower end of the opening of the installation hole 12, but withdrawn at a predetermined distance away from the upper end of the opening of the installation hole 12 in a direction along the center axis Ci of the installation hole 12. That is, the installation hole 12 is not formed perpendicular to the pent roof 10, but an end face of the injector 11 is oriented perpendicular to the center axis Ci of the installation hole 12. Therefore, given that the end face of the injector 11 is partially aligned with an opening end of the installation hole 12, a remaining portion of the end face of the injector 11 is situated axially outer side in the installation hole 12. In the combustion chamber 5, according to the exemplary embodiment of the present disclosure, an additionally expanded surface area 13 is formed on an upper inner surface of the installation hole 12 from a portion to which the end face of the injector 11 is situated to the opening end of the installation hole 12.

For example, the additionally expanded surface area 13 is formed by drilling the upper inner surface of the installation hole 12. According to the exemplary embodiment of the present disclosure, the additionally expanded surface area 13 is formed such that a (tilt) angle θf between the additionally expanded surface area 13 and the joint surface F is narrower than the tilt angle θi of the common center axis Ci of the injector 11 and the installation hole 12 (θf<θi). In other words, an angle of inclination of the additionally expanded surface area 13 with respect to the joint surface F is milder than that of the center axis Ci so as to create an escape zone of the fuel flowing from the injector 11 toward the ignition plug 6 while dispersing. According to the exemplary embodiment of the present disclosure, the definition of the "tilt angle" is an angle measured along a plane (including the I-I line in FIG. 2) perpendicular to the joint surface F and passing through the fuel injecting direction from the injector 11.

Specifically, the tilt angle θf of the additionally expanded surface area 13 is an angle between: a generating line of the additionally expanded surface area 13 extending along (or parallel to) the fuel injecting direction from the injector 11; and the joint surface F. Given that the injector 11 has only one spray outlet, the additionally expanded surface area 13 is formed into an arcuate surface or cylindrical surface in which the tilt angle Of is unchanged from a predetermined angle entirely within the additionally expanded surface area 13. Whereas, given that the injector 11 has a plurality of spray outlets, the fuel is injected from the injector 11 in a plurality of directions. In this case, therefore, distances (or angles) between each spray of the fuel injected from those outlets of the injector 11 and the additionally expanded surface area 13 are different from one another.

Figure 4:
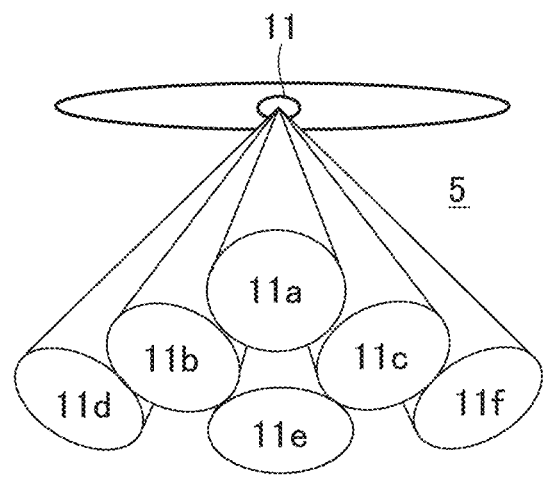
FIG. 4 is a schematic illustration showing one example of the injector having a plurality of spray outlets.

One example of a structure of the injector 11 having a plurality of spray outlets is shown in FIG. 4. According to the example shown in FIG. 4, the injector 11 has six spray outlets in total arranged around the center axis Ci of the injector 11 at substantially equal intervals.

Specifically, the fuel injected from the first outlet 11a as an uppermost outlet flows closest to the pent roof 10. Whereas, sprays of the fuels injected from other outlets 11b, 11c, 11d, 11e, and 11f flow downwardly away from the pent roof 10. Since the first outlet 11a is situated closest to the pent roof 10, the fuel injected from the first outlet 11a would be disrupted by e.g., the Coanda effect. Specifically, the fuel injected from the first outlet 11a would be attracted to the pent roof 10 by the Coanda effect, in order to allow the fuel injected from the first outlet 11a to flow smoothly toward the electrode 7 of the ignition plug 6 without hindrance, in the combustion chamber 5 shown in FIGS. 1 to 3, a depressed surface area 13a is formed in the additionally expanded surface area 13. Specifically, the depressed surface area 13a is a groove having an arcuate cross-sectional shape that is depressed upwardly in the vicinity of the first outlet 11a along the flowing direction of the fuel injected from the first outlet 11a. More specifically, a tilt angle θf' between the depressed surface area 13a and the joint surface F is narrower than the tilt angle θi of the common center axis Ci of the injector 11 and the installation hole 12 (θf'<θi), and also narrower than the tilt angle θf between the additionally expanded surface area 13 and the joint surface F (θf'<θf<θi). Thus, the tilt angle θf' of the depressed surface area 13a and the tilt angle θf of the additionally expanded surface area 13 are different from the tilt angle θi of the common center axis Ci of the injector 11 and the installation hole 12, and for example, the depressed surface area 13a and the additionally expanded surface area 13 may be formed by drilling or milling the pent roof 10 after forming the installation hole 12.

In the internal combustion engine having the combustion chamber 5, the fuel is injected from the injector 11 toward the electrode 7 of the ignition plug 6 when the piston 3 comes to the top dead center, or during a compression process immediately after the piston 3 passes through the top dead center. In this situation, a tumble flow Tb is created in the combustion chamber 5 so that the fuel flows from the intake port 8 toward the exhaust port 9 along the pent roof 10, and turns along the electrode 7 of the ignition plug 6 to further flow toward the injector 11 along the piston head.

As described, the leading end (i.e., the spray outlet(s) or nozzle(s)) of the injector 11 is positioned within the installation hole 12. Accordingly, the spray of the fuel injected from the injector 11 flows along the additionally expanded surface area 13 and enters the combustion chamber 5 while dispersing. Whereas, the additionally expanded surface area 13 is inclined such that a front section (i.e., an opening end section) thereof deviates radially outwardly from the common center axis Ci of the injector 11 and the installation hole 12. In other words, the additionally expanded surface area 13 is inclined such that the front section thereof deviates radially outwardly from a virtual plane extending from an inner surface of the installation hole 12. That is, an escape zone of the spray of the fuel is created by the additionally expanded surface area 13. According to the exemplary embodiment of the present disclosure, therefore, the spray of the fuel will not be attracted to the pent roof 10 or the additionally expanded surface area 13. For this reason, the spray of the fuel is allowed to flow smoothly toward the electrode 7 of the ignition plug 6 without hindrance even if the fuel is injected at a high pressure or high speed. In addition, since a spraying pressure of the injector 11 will not be restricted by the additionally expanded surface area 13, the spraying pressure of the injector 11 may be raised to refining the fuel injected therefrom.

Given that the multi-hole injector shown in FIG. 4 is adopted as the injector 11, the spray of fuel injected from the first outlet 11a flows near the depressed surface area 13a. However, the tilt angle θf' of the depressed surface area 13a is narrower than the tilt angle θi of the injector 11 and the tilt angle θf of the additionally expanded surface area 13. That is, the clearance between the depressed surface area 13a and the joint surface F increases gradually toward the ignition plug 6. According to the exemplary embodiment of the present disclosure, therefore, the spray of the fuel will not be attracted to the depressed surface area 13a so that the sprays of the fuel injected from the outlets of the injector 11 are allowed to flow and disperse homogeneously. For this reason, ignition of the fuel and a flame of the fuel may be stabilized in the internal combustion engine.

In addition, an opening (area) of the installation hole 12 increases gradually toward the combustion chamber 5. In other words, a corner between the additionally expanded surface area 13 and the pent roof 10 is widened so that a joint portion between the additionally expanded surface area 13 and the pent roof 10 may be substantially flattened. According to the exemplary embodiment of the present disclosure, therefore, the tumble flow tb is allowed to enter the installation hole 12. That is, the flame generated by igniting the electrode 7 of the ignition plug 6 is allowed to enter the additionally expanded surface area 13. For this reason, the air-fuel mixture can be combusted almost completely within the additionally expanded surface area 13. Consequently, an unburned hydrocarbon may be reduced thereby improving a fuel economy while reducing an exhaust gas.

Although the above exemplary embodiments of the present disclosure have been described, it will be understood by those skilled in the art that the present disclosure should not be limited to the described exemplary embodiments, and various changes and modifications can be made within the scope of the present disclosure. For example, a position of the injector 11 may be altered according to need as long as the fuel is injected laterally toward the ignition plug 6. In addition, the numbers of the intake ports 8, the exhaust ports 9, and the valves may be altered depending on a displacement and a structure of the internal combustion engine.

What is claimed is:

1. A combustion chamber structure for an internal combustion engine, comprising: a combustion chamber that is formed in a cylinder head attached to a cylinder block; an ignition plug having an electrode that is arranged in an upper section of the combustion chamber; an injector that is attached to the cylinder head to inject fuel into the combustion chamber; and an installation hole that is formed in the cylinder head such that an opening of the installation hole is joined to a periphery of a roof of the combustion chamber, and that a center axis of the installation hole tilts downwardly toward the combustion chamber below the electrode of the ignition plug, wherein the injector is held in the installation hole while being in contact with an inner surface of the installation hole such that a leading end of the injector is withdrawn from an upper end of the opening of the installation hole in a direction along the center axis of the installation hole, an additionally expanded surface area is formed on an upper inner surface of the installation hole from a portion to which the leading end of the injector is situated to the upper end of the opening of the installation hole, an angle between the additionally expanded surface area and a joint surface of the cylinder head joined to the cylinder block which is measured along a plane perpendicular to the joint surface and passing through the center axis of the installation hole, is narrower than an angle between the center axis of the installation hole and the joint surface of the cylinder head, wherein the injector comprises a plurality of spray outlets to inject the fuel, the additionally expanded surface area includes a depressed surface area that is depressed upwardly in the vicinity of an uppermost one of the spray outlets of the injector along a flowing direction of the fuel injected from the uppermost one of the spray outlets of the injector, and an angle between the depressed surface area and the joint surface of the cylinder head is narrower than the angle between the additionally expanded surface area and the joint surface of the cylinder head.

2. The combustion chamber structure as claimed in claim 1, further comprising two intake ports formed in the roof of the combustion chamber,
wherein the injector is disposed between the intake ports.

3. The combustion chamber structure as claimed in claim 1, further comprising two intake ports formed in the roof of the combustion chamber, wherein the injector is disposed between the intake ports.

4. The combustion chamber structure as claimed in claim 2, further comprising two exhaust ports formed in the roof of the combustion chamber on an opposite side of the intake ports across the electrode of the ignition plug,
wherein a tumble flow of the fuel is created in the combustion chamber so that the fuel flows from the intake port toward the exhaust port along the roof, and turns along the electrode of the ignition plug to further flow toward the intake port in a lower section of the combustion chamber to enter the opening of the installation hole.

5. The combustion chamber structure as claimed in claim 3, further comprising two exhaust ports formed in the roof of the combustion chamber on an opposite side of the intake ports across the electrode of the ignition plug,
wherein a tumble flow of the fuel is created in the combustion chamber so that the fuel flows from the intake port toward the exhaust port along the roof, and turns along the electrode of the ignition plug to further flow toward the intake port in a lower section of the combustion chamber to enter the opening of the installation hole.

* * * * *